US008822556B2

(12) United States Patent
Erdelt et al.

(10) Patent No.: US 8,822,556 B2
(45) Date of Patent: Sep. 2, 2014

(54) ONE-COMPONENT MOISTURE-CURING POLYMER FOAM

(75) Inventors: Sabine Erdelt, Zurich (CH); Roberto Cutri, Wohlen (CH); Urs Jaeger, Jona (CH)

(73) Assignee: Sika Technology AG, Baar (CH)

( * ) Notice: Subject to any disclaimer, the term of this patent is extended or adjusted under 35 U.S.C. 154(b) by 1318 days.

(21) Appl. No.: 12/292,383

(22) Filed: Nov. 18, 2008

(65) Prior Publication Data

US 2009/0159178 A1 Jun. 25, 2009

(30) Foreign Application Priority Data

Dec. 19, 2007 (EP) .................................. 07150155

(51) Int. Cl.
| | |
|---|---|
| *C08J 9/00* | (2006.01) |
| *C08J 9/12* | (2006.01) |
| *C08G 18/00* | (2006.01) |
| *C08G 77/00* | (2006.01) |
| *C09J 197/02* | (2006.01) |
| *C09J 5/08* | (2006.01) |
| *C08J 9/30* | (2006.01) |
| *C09J 175/04* | (2006.01) |
| *C09J 201/10* | (2006.01) |
| *B29C 44/34* | (2006.01) |
| *C08L 75/04* | (2006.01) |

(52) U.S. Cl.
CPC *C09J 5/08* (2013.01); *C09J 197/02* (2013.01); *C08J 9/12* (2013.01); *C08L 75/04* (2013.01); *C08J 2207/02* (2013.01); *C08J 9/30* (2013.01); *C08G 2170/60* (2013.01); *C09J 175/04* (2013.01); *C08J 2375/04* (2013.01); *C09J 201/10* (2013.01); *B29C 44/3446* (2013.01)
USPC .............. 521/82; 521/154; 521/155; 521/159

(58) Field of Classification Search
USPC ............................ 521/155, 159, 170, 82, 154
See application file for complete search history.

(56) References Cited

U.S. PATENT DOCUMENTS

| | | | |
|---|---|---|---|
| 3,632,557 A | 1/1972 | Brode et al. | |
| 3,830,760 A * | 8/1974 | Bengtson ...................... 521/112 |
| 3,971,751 A | 7/1976 | Isayama et al. | |
| 4,345,053 A | 8/1982 | Rizk et al. | |
| 4,880,845 A * | 11/1989 | Moss et al. ..................... 521/114 |
| 5,126,170 A | 6/1992 | Zwiener et al. | |
| 5,990,257 A | 11/1999 | Johnston et al. | |
| 6,171,678 B1 * | 1/2001 | Holeschovsky et al. ......... 428/97 |
| 6,207,766 B1 | 3/2001 | Doi et al. | |
| 6,455,606 B1 * | 9/2002 | Kaku et al. ..................... 521/170 |
| 2001/0054474 A1 * | 12/2001 | Braun et al. .................... 156/94 |
| 2002/0007003 A1 | 1/2002 | Merz et al. | |
| 2005/0165124 A1 | 7/2005 | Brown | |
| 2006/0180274 A1 * | 8/2006 | Burckhardt et al. ....... 156/331.7 |
| 2007/0051832 A1 | 3/2007 | Jones et al. | |
| 2007/0141361 A1 | 6/2007 | Burckhardt et al. | |

FOREIGN PATENT DOCUMENTS

| | | |
|---|---|---|
| DE | 25 21 277 A1 | 11/1976 |
| DE | 10 2005 042 380 A1 | 3/2007 |
| EP | 0 403 921 A2 | 12/1990 |
| EP | 0 405 721 A1 | 1/1991 |
| EP | 04803420 A2 * | 4/1992 |
| EP | 1 152 019 A1 | 11/2001 |
| JP | A-3-6281 | 1/1991 |
| RU | 2 229 489 C1 | 5/2004 |
| WO | WO 2004/056905 A1 | 7/2004 |

OTHER PUBLICATIONS

English-language abstract and machine translation provided by the European Patent Office.*
English-language translation of Office Action issued in Russian Patent Application No. 2008150334/04; mailed Aug. 25, 2010.

* cited by examiner

*Primary Examiner* — Melissa Rioja
(74) *Attorney, Agent, or Firm* — Oliff PLC

(57) ABSTRACT

The present invention relates to a one-component, moisture-curing foam consisting of 10 to 60% by volume of at least one gas and of a one-component, moisture-curing composition Z comprising at least one polymer P having isocyanate groups and/or alkoxysilane groups and 5 to 50% by weight of carbon black, based on the total weight of the one-component, moisture-curing foam.
Such foams are suitable as adhesives or sealants, for the production of coatings or for the film-filling of hollow structures, in particular in vehicle construction.

19 Claims, 2 Drawing Sheets

ONE-COMPONENT MOISTURE-CURING POLYMER FOAM

FIELD OF THE INVENTION

The invention relates to the field of one-component, moisture-curing foams comprising polymers having isocyanate groups and/or alkoxysilane groups.

PRIOR ART

Because of the lower material consumption and the accompanying cost savings and/or the reduction in weight, but also for changing the properties of a composition or filling cavities for sound insulation or strengthening, compositions, the majority of which are used as adhesives or sealants, have long been foamed.

Polyurethane compositions which are stored, for example, in pressure containers are also known, the composition foaming by the action of a blowing agent during application, i.e. on emergence from the pressure container and with the accompanying pressure relief. For example, compositions which contain heat- or moisture-activatable blowing agents and are foamed only after their application are likewise known. The disadvantage of such foaming methods is that precise application of the foam is virtually impossible. The volume increase of the composition and the direction in which the foam expands when it is produced by chemical or physical blowing agents during or after the application cannot be predicted very accurately. The expanding foam may, for example, push the substrates to be adhesively bonded towards one another or flow out of sealing joints so that poor end products result.

A further disadvantage of such foams is that the degree of foaming is very difficult to establish and cannot be checked prior to application.

SUMMARY OF THE INVENTION

The object of the present invention is therefore to provide a one-component, moisture-curing foam which overcomes the disadvantages of the prior art and can be applied precisely.

According to the invention, this is achieved by the features of the first claim. Surprisingly, it was found that a one-component, moisture-curing foam which is present in the form of foam even prior to application is particularly suitable for use as an adhesive or sealant, for the production of coatings or for the foam-filling of hollow structures.

The advantage of the present invention is, inter alia, that the field of use of one-component, moisture-curing compositions is extended and they can now be used economically and with the saving of weight as foam even over large areas. A further very important advantage is that the one-component, moisture-curing foam can be applied very precisely and substantially retains its shape and structure during the curing process. It is thus possible to produce high-precision contact adhesive bonds or seal joints even with one-component, moisture-curing polymer foams. A further advantage of the invention is that the degree of foaming of the one-component, moisture-curing foam can be very accurately adjusted and it is also possible to produce foams having a very high proportion of gas. As a result of the exact adjustment of the degree of foaming, foams which have different properties and can be used for different purposes can be produced from identical one-component, moisture-curing compositions.

By a suitable process for the production and the directly subsequent application of the one-component, moisture-curing foams, it is even possible to change the gas content of the foam during application. This is particularly advantageous since, particularly in the case of mechanical application by means of an application robot, it is therefore not necessary to use a plurality of plants and the application can be effected in one pass, i.e. without setting down the application device.

Further aspects of the invention form the subject of further independent claims. Particularly preferred embodiments of the invention form the subject of the dependent claims.

DESCRIPTION OF THE PREFERRED EMBODIMENTS

The present invention relates to a one-component, moisture-curing foam consisting of 10 to 60% by volume of at least one gas and a one-component, moisture-curing composition Z comprising at least one polymer P having isocyanate groups and/or alkoxysilane groups and 5 to 50% by weight, preferably 10 to 30% by weight, of carbon black, based on the total weight of the one-component, moisture-curing foam.

In the present document, the term "foam" is understood as meaning a structure comprising gas-filled, spherical or polyhedral cells which are bounded by liquid, semiliquid, highly viscous or solid cell struts.

In the present document, substance names beginning with "poly", such as polyol or polyisocyanate, designate substances which formally contain two or more of the functional groups occurring in their name per molecule.

In the present document, the term "polymer" firstly comprises a group of macromolecules which are chemically uniform but differ with respect to degree of polymerization, molar mass and chain length, which group was prepared by a polyreaction (polymerization, polyaddition, polycondensation). Secondly, the term also comprises derivatives of such a group of macromolecules from polyreactions, i.e. compounds which are obtained by reactions, such as, for example, additions or substitutions, of functional groups on specified macromolecules and which may be chemically uniform or chemically nonuniform. The term furthermore also comprises so-called prepolymers, i.e. reactive oligomeric preadducts, the functional groups of which are involved in the synthesis of macromolecules.

The term "polyurethane polymer" comprises all polymers which are prepared by the so-called diisocyanate polyaddition process. This also includes those polymers which are virtually or completely free of urethane groups. Examples of polyurethane polymers are polyether polyurethanes, polyester polyurethanes, polyether polyureas, polyureas, polyester polyureas, polyisocyanurates and polycarbodiimides.

Suitable polymers P are firstly polymers based on polymers terminated with alkoxysilane groups, as are known to the person skilled in the art under the designation "MS polymers", or secondly polymers based on polyurethanes terminated with alkoxysilane groups, as are known to the person skilled in the art by the designation "SPUR" (Silane Terminated Polyurethanes).

These are, for example, reaction products of polyurethane polymers having isocyanate groups with organosilanes reactive toward isocyanates and terminated with alkoxysilane groups, such as, for example, mercaptoalkyl-silanes or aminoalkylsilanes, described, for example, in U.S. Pat. No. 3,632,557, in particular the reaction products of polyurethane polymers having isocyanate groups with Michael adducts of aminoalkylsilanes and maleic or fumaric diesters, described, for example, in EP 0 403 921; products from hydrosilylation reactions of polymers having terminal double bonds, in particular of allyl-terminated polyoxyalkylene polymers, with alkoxysilanes, described, for example, in U.S. Pat. No. 3,971,751 and U.S. Pat. No. 6,207,766; reaction products of polymers containing active hydrogen atoms, for example in the form of hydroxyl or mercapto groups, with isocyanatoalkylsilanes, described, for example, in U.S. Pat. No. 4,345,053 and U.S. Pat. No. 5,990,257; polymers containing 3-(N-silylalkyl)aminopropenoate groups, which are reaction products of polymers containing 3-oxopropanoate groups and aminoalkylsilanes, described, for example, in WO 2004/056905. The content of the patents mentioned, which are referred to above, is incorporated into this application and the disclosure thereof is hereby included.

On the other hand, polyurethane polymers having isocyanate groups are also suitable as polymer P. Such suitable polyurethane polymers can be prepared in particular from the reaction of at least one polyisocyanate with at least one polyol. This reaction can be effected by reacting the polyol and the polyisocyanate by customary processes, for example at temperatures at 50° C. to 100° C., optionally with the concomitant use of suitable catalysts, the polyisocyanate being metered so that the isocyanate groups thereof are present in stoichiometric excess relative to the hydroxyl groups of the polyol. Advantageously, the polyisocyanate is metered so that an NCO/OH ratio of 1.5 to 5, in particular one of 1.8 to 3, is maintained. Here, the NCO/OH ratio is understood as meaning the ratio of the number of isocyanate groups used to the number of hydroxyl groups used. A content of free isocyanate groups of 0.5 to 15% by weight, particularly preferably of 1 to 10% by weight, preferably remains in the polyurethane polymer after the reaction of all hydroxyl groups of the polyol.

Commercially available aliphatic, cycloaliphatic or aromatic polyisocyanates, in particular diisocyanates, can be used as polyisocyanates for the preparation of the polyurethane polymer.

For example, these are diisocyanates, the isocyanate groups of which are bonded in each case to an aliphatic, cycloaliphatic or arylaliphatic C atom, also referred to as "aliphatic diisocyanates", such as 1,6-hexamethylene diisocyanate (HDI), 2-methylpentamethylene-1,5-diisocyanate, 2,2,4- and 2,4,4-trimethyl-1,6-hexamethylene diisocyanate (TMDI), 1,12-dodeca-methylene diisocyanate, lysine and lysine ester diisocyanate, cyclohexane 1,3-diisocyanate, cyclohexane 1,4-diisocyanate, 1-isocyanato-3,3,5-trimethyl-5-isocyanatomethylcyclohexane (=isophorone diisocyanate or IPDI), perhydro-2,4'-diphenylmethane diisocyanate and perhydro-4,4'-diphenylmethane diiso-cyanate, 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3-xylylene diisocyanate, m- and p-tetramethyl-1,4-xylylene diisocyanate, bis(1-isocyanato-1-methylethyl)naphthalene; and diisocyanates having isocyanate groups bonded in each case to an aromatic C atom, also referred to as "aromatic diisocyanates", such as 2,4- and 2,6-tolylene diisocyanate (TDI), 4,4'-, 2,4'- and 2,2'-diphenylmethane diisocyanate (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TOBI); oligomers and polymers of the abovementioned isocyanates, and any mixtures of the abovementioned isocyanates.

Suitable polyols are in particular polyetherpolyols, polyesterpolyols and polycarbonatepolyols and mixtures of these polyols.

Particularly suitable polyetherpolyols, also referred to as polyoxyalkylenepolyols or oligoetherols, are those which are polymerization products of ethylene oxide, 1,2-propylene oxide, 1,2- or 2,3-butylene oxide, oxetane, tetrahydrofuran or mixtures thereof, optionally polymerized with the aid of an initiator having two or more active hydrogen atoms per molecule, such as, for example, water, ammonia or compounds having a plurality of OH or NH groups, such as, for example, 1,2-ethanediol, 1,2- and 1,3-propanediol, neopentyl glycol, diethylene glycol, triethylene glycol, the isomeric dipropylene glycols and tripropylene glykols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline and mixtures of said compounds. Both polyoxyalkylenepolyols which have a low degree of unsaturation (measured according to ASTM D-2849-69 and stated in milliequivalents of unsaturation per gram of polyol (meq/g)), prepared, for example, with the aid of so-called double metal cyanide complex catalysts (DMC catalysts), and polyoxyalkylenepolyols having a higher degree of unsaturation, prepared, for example, with the aid of anionic catalysts, such as NaOH, KOH, CsOH or alkali metal alcoholates, can be used.

Particularly suitable are polyoxyethylenepolyols and polyoxypropylenepolyols, in particular polyoxyethylenediols, polyoxypropylenediols, polyoxyethylenetriols and polyoxypropylenetriols.

Particularly suitable are polyoxyalkylenediols or polyoxyalkylenetriols having a degree of unsaturation lower than 0.02 meq/g and having a molecular weight in the range from 1000 to 30000 g/mol, and polyoxyethylenediols, polyoxyethylenetriols, polyoxypropylenediols and polyoxypropylenetriols having a molecular weight of 400 to 8000 g/mol. In the present document, "molecular weight" is always understood as meaning the average molecular weight Mn.

Likewise particularly suitable are so-called ethylene oxide-terminated ("EO-endcapped", ethylene oxide-endcapped) polyoxypropylenepolyols. The latter are specific polyoxypropylenepolyoxyethylenepolyols which are obtained, for example, if pure polyoxypropylenepolyols, in particular polyoxy-propylenediols and -triols, are further alkoxylated after the end of the polypropoxylation reaction and thus have primary hydroxyl groups. In this case, polyoxypropylenepolyoxyethylenediols and polyoxypropylenepolyoxyethylene-triols are preferred.

Polybutadienepolyols terminated with hydroxyl groups, such as, for example, those which are prepared by polymerization of 1,3-butadiene and allyl alcohol or by oxidation of polybutadiene, and the hydrogenation products thereof, are furthermore suitable.

Styrene-acrylonitrile-grafted polyetherpolyols, as are commercially available, for example, under the tradename Lupranolo from Elastogran GmbH, Germany, are furthermore suitable.

Particularly suitable polyesterpolyols are polyesters which carry at least two hydroxyl groups and are prepared by known processes, in particular the polycondensation of hydroxycarboxylic acids or the polycondensation of aliphatic and/or aromatic polycarboxylic acids with dihydric or polyhydric alcohols.

Particularly suitable polyesterpolyols are those which are prepared from dihydric or trihydric alcohols, such as, for example, 1,2-ethanediol, diethylene glycol, 1,2-propanediol, dipropylene glycol, 1,4-butanediol, 1,5-pentanediol, 1,6-hexanediol, neopentylglycol, glycerol, 1,1,1-trimethylolpropane or mixtures of the abovementioned alcohols with organic dicarboxylic acids or the anhydrides or esters thereof, such as, for example, succinic acid, glutaric acid, adipic acid, trimethyladipic acid, suberic acid, azelaic acid, sebacic acid, dodecanedicarboxylic acid, maleic acid, fumaric acid, dimeric fatty acid, phthalic acid, phthalic anhydride, isophthalic acid, terephthalic acid, dimethyl terephthalate, hexahydrophthalic acid, trimellitic acid and trimellitic anhydride or mixtures of the abovementioned acids, and polyesterpolyols obtained from lactones, such as, for example, ε-caprolactone.

Polyesterdiols are particularly suitable, especially those which are prepared from adipic acid, azelaic acid, sebacic acid, dodecanedicarboxylic acid, dimeric fatty acid, phthalic acid, isophthalic acid and terephthalic acid as the dicarboxylic acid and from lactones, such as, for example, ε-caprolactone, and from ethylene glycol, diethylene glycol, neopentylglycol, 1,4-butanediol, 1,6-hexanediol, dimeric fatty acid diol and 1,4-cyclohexanedimethanol as the dihydric alcohol.

Particularly suitable polycarbonatepolyols are those obtainable by reacting, for example, the abovementioned alcohols used for the synthesis of the polyesterpolyols with dialkyl carbonates, such as dimethyl carbonate, diaryl carbonates, such as diphenyl carbonate, or phosgene. Particularly suitable are polycarbonatediols, in particular amorphous polycarbonatediols.

Further suitable polyols are poly(meth)acrylate polyols.

Furthermore, polyhydrocarbonpolyols, also referred to as oligohydrocarbonols, for example polyhydroxy-functional ethylene-propylene, ethylene-butylene or ethylene-propylene-diene copolymers, as produced, for example, by Kraton Polymers, USA, or polyhydroxy-functional copolymers obtained from dienes, such as 1,3-butadiene, or diene mixtures and vinylmonomers, such as styrene, acrylonitrile or isobutylene, or polyhydroxy-functional polybutadienepolyols, for example those which are prepared by copolymerization of 1,3-butadiene and allyl alcohol and can also be hydrogenated, are likewise suitable.

Polyhydroxy-functional acrylonitrile/butadiene copolymers, as can be prepared, for example, from epoxides or aminoalcohols and carboxyl-terminated acrylonitrile/butadiene copolymers (commercially available under the name Hycar® CTBN from Emerald Performance Materials, LLC, USA), are furthermore suitable.

Said polyols preferably have an average molecular weight of 250 to 30000 g/mol, in particular of 1000 to 30000 g/mol, and an average OH functionality in the range from 1.6 to 3.

Particularly suitable polyols are polyesterpolyols and polyetherpolyols, in particular polyoxyethylenepolyol, polyoxypropylenepolyol and polyoxy-propylenepolyoxyethylenepolyol, preferably polyoxyethylenediol, polyoxypropylenediol, polyoxyethylenetriol, polyoxypropylenetriol, polyoxypropylene-polyoxyethylenediol and polyoxypropylenepolyoxyethylenetriol.

The proportion of the polymer P is preferably 20 to 80% by weight, in particular 20 to 60% by weight, preferably 25 to 50% by weight, based on the total weight of the foam.

The carbon black, which is present as a filler in the one-component, moisture-curing foam, is in particular industrially produced carbon black.

In addition to the carbon black, the one-component, moisture-curing foam may optionally comprise further fillers, such as mica, talc, kaolin, wollastonite, feldspar, syenite, chlorite, bentonite, montmorillonite, calcium carbonate (precipitated or ground), dolomite, quartz, silicas (pyrogenic or precipitated), cristobalite, calcium oxide, aluminium hydroxide, magnesium oxide, hollow ceramic spheres, hollow glass spheres, hollow organic spheres, glass spheres or coloured pigments.

The gas which is present in the one-component, moisture-curing foam is selected from the group consisting of nitrogen ($N_2$), hydrogen ($H_2$), carbon monoxide (CO), nitrous oxide ($N_2O$), noble gas and mixtures of these gases and air. Nitrogen or dried air is particularly suitable. Dried air is preferred. Dried air is understood as meaning air which is as far as possible water-free, in particular completely water-free.

The gas is enclosed in cells in the one-component, moisture-curing foam, which in particular are distributed homogeneously in the foam.

The composition Z for the production of the one-component, moisture-curing foam is preferably free of chemical blowing agents.

The one-component, moisture-curing foam may furthermore contain a thixotropic agent C based on a urea derivative. The urea derivative is in particular a reaction product of an aromatic monomeric diisocyanate with an aliphatic amine compound. It is also entirely possible to react a plurality of different monomeric diisocyanates with one or more aliphatic amine compounds or a monomeric diisocyanate with a plurality of aliphatic amine compounds. The reaction product of 4,4'-diphenylmethane diisocyanate (MDI) with butylamine has proved to be particularly advantageous.

The urea derivative is preferably present in a carrier material. The carrier material may be a plasticizer, in particular a phthalate or an adipate, preferably a diisodecyl phthalate (DIDP) or dioctyl adipate (DOA). The carrier medium may also be a non-diffusing carrier medium. This is preferable for ensuring as little migration as possible after curing of unreacted constituents. Block polyurethane polymers are preferred as nondiffusing carrier media. The preparation of such preferred urea derivatives and carrier materials are described in detail in Patent Application EP 1 152 019 A1, the disclosure of which is here included. The carrier material is advantageously a block polyurethane polymer, in particular obtained by reacting a trifunctional polyetherpolyol with IPDI and subsequently blocking the terminal isocyanate groups with ε-caprolactam.

The total proportion of the thixotropic agent C is advantageously 0.1 to 40% by weight, preferably 5 to 25% by weight, based on the total weight of the foam. Preferably, the weight ratio of urea derivative to the optionally present carrier medium is between 0.02:1 and 1:1, in particular between 0.05:1 and 0.3:1

The one-component, moisture-curing foam may comprise further constituents, in particular catalysts, heat and/or light stabilizers, plasticizers, solvents, blowing agents, dyes and pigments.

These additional constituents are preferably already present in the moisture-curing composition Z before the production of the foam. It is therefore advantageous to select the optionally present further constituents so that the shelf-life of the moisture-curing composition Z, or optionally also of the one-component, moisture-curing foam, is not adversely affected by the presence of such a constituent. In particular, the foamability of the composition Z and the application and curing properties of the foam should not be adversely affected during the production and the storage of the composition Z. This means that reactions, in particular of the isocyanate groups, which lead to the chemical curing of the foam described should not occur to a significant extent during the storage. It is therefore particularly advantageous that said constituents contain, or release during storage, no water or at most traces of water. For this reason, it may be expedient and appropriate chemically or physically to dry certain constituents prior to mixing into the composition.

The composition Z described is preferably prepared and stored in the absence of moisture. It thus remains storage-stable, i.e. it can be stored in the absence of moisture in a suitable packaging or arrangement, such as, for example, a drum, a bag or a cartridge, over a period of several months to a year or longer without it changing to an extent relevant for its use.

In particular, one-component, moisture-curing adhesives and sealants, as are commercially available under the product line Sikaflex® from Sika Schweiz AG, can be used as composition Z.

After the foaming and the application of the composition Z, the curing of the foam is effected by virtue of the fact that said foam comes into contact with water, in particular in the form of atmospheric humidity, during the application. The curing reaction is also referred to as crosslinking.

Either the water required for the curing reaction can originate from the air (atmospheric humidity) or the foam can be brought into contact with a water-containing component, for example by spreading, for example using a smoothing means, or by spraying, or a water-containing component can be added to the foam during the application, for example in the form of a water-containing paste, which is mixed in, for example, via a static mixer.

In the cured state, the foam has high mechanical strength in combination with good extensibility and has good adhesion properties even after considerable contamination with moisture. It is therefore suitable for a multiplicity of applications, in particular as a resilient adhesive, a resilient sealant or as a resilient coating.

The invention furthermore comprises a process for the production of a one-component, moisture-curing foam.

A first, preferred, process for the production of a one-component, moisture-curing foam consists in feeding the gas to a one-component, moisture-curing composition Z at temperatures of 0 to 80° C., in particular of 10 to 60° C., and mixing it into the composition and distributing it with the aid of a mixing apparatus. In this process, the gas can be fed in, for example, in such a way that the gas is blown into the composition via an excess-pressure line, or that it is sucked into the composition by reduced pressure in a mixing apparatus.

Such a preferred process is described, for example, in DE 10 2005 042 380 A1.

A second process for the production of a one-component, moisture-curing foam consists in injecting a gas which is present in the liquid or supercritical state into a one-component, moisture-curing composition Z which is under pressure, and mixing it into the composition and distributing it with the aid of a mixing apparatus. During the subsequent pressure relief of the composition to atmospheric pressure, the gas expands and a foam forms.

A substantial point in the case of all processes for the production of the one-component, moisture-curing foam is that the composition Z is foamed before the application, i.e. the foaming process is substantially complete at the time of application. Only in this way is it possible to ensure that the composition can be precisely applied and that, when the one-component, moisture-curing foam is used as an adhesive, no shifting of the substrates to be adhesively bonded takes place through the foaming process during the curing.

Furthermore, the present invention comprises the use of a previously described one-component, moisture-curing foam as an adhesive or sealant or for the production of coatings and for the foam-filling of hollow structures. The foam can be used for a large number of potential uses.

In particular, the one-component, moisture-curing foam according to the invention is suitable as a moisture-curing adhesive for elastic adhesive bonds and seals in vehicle-construction.

With the one-component, moisture-curing foam according to the invention, based on a composition Z, it is possible to vary the density of the resulting moisture-curing foam via different degrees of foaming. Consequently, one-component, moisture-curing foams having different proportions of gas can be produced from the same composition Z and used for different purposes. With the use of a suitable foaming and mixing unit, which is employed immediately before the application unit for the one-component, moisture-curing foam, it is also possible to change the degree of foaming during the application in a very short time.

The present invention furthermore relates to a process for the adhesive bonding of substrates S1 and S2, comprising the steps
  c1) application of a one-component, moisture-curing foam according to the above description to a substrate S1;
  c2) bringing of the one-component, moisture-curing foam into contact with a second substrate S2;
or
  d1) application of a one-component, moisture-curing foam according to the above description to the substrates S1 and S2;
  d2) joining of the two substrates S1 and S2 coated with the one-component, moisture-curing foam.

The substrate S1 consists of a material which is identical to or different from that of the substrate S2.

The present invention also relates to a process for sealing a substrate S1 and/or S2, comprising the steps
  e1) application of a one-component, moisture-curing foam according to the above description to a substrate S1 and/or a substrate S2;
or
  f1) application of a one-component, moisture-curing foam according to the above description between the surfaces of the substrates S1 and S2;

The substrate S1 consists of a material which is identical to or different from that of the substrate S2.

The present invention furthermore relates to a process for the production of a coating on a substrate S1 comprising the step
  g1) application of a one-component, moisture-curing foam according to the above description to a substrate S1.

The present invention also relates to a process for the foam-filling of hollow structures, comprising the step
  h1) injection of a one-component, moisture-curing foam into an existing hollow structure.

The foam can be used as a seal and/or for sound insulation and/or for structural strengthening of the hollow structure, for example of a structural component.

Both after the adhesive bonding of step c2) and d2) and after the sealing of steps e1) and f1) after the coating of step g1) and after the foam-filling of hollow structures of step h1), the curing of the one-component, moisture-curing foam is effected by means of water, in particular in the form of atmospheric humidity.

A further part of the invention is that, in the above-described process, the degree of foaming of the composition Z and hence the gas content of the one-component, moisture-curing foam according to the invention can be varied during the application of the foam by connecting the expansion apparatus and the application apparatus in series or combining them. This is effected, for example, by foaming the composition Z in an expansion apparatus and by applying the foam thus produced directly from this expansion apparatus. For the present invention, it is of considerable importance that the production of the one-component, moisture-curing foam be complete on application, i.e. for example when the foam leaves the die of the application device. A suitable expansion and application plant can be actuated by a computer by means of suitable software in order to adjust the degree of foaming. An advantage of varying the degree of foaming during the application is that foams having different properties can be applied from the same application device, preferably without discontinuation.

FIG. 1 schematically shows a process for the production and the application and the curing of a one-component, moisture-curing foam according to the invention. Such a process is used, for example, for the adhesive bonding of two substrates S1 and S2 on a production line. The composition Z 1 is fed together with a gas from a gas container 2 into a mixing apparatus M where the composition Z 1 and the gas are mixed with one another. The one-component, moisture-curing foam 3 forming therefrom is immediately applied from the mixing apparatus M by means of an application device or by hand to a substrate S1 4. Thereafter, the substrate S1 4 is joined to a second substrate S2 4' via the one-component, moisture-curing foam. The one-component, moisture-curing foam then cures by means of water, in particular in the form of atmospheric humidity, to give a moisture-cured foam 3'.

The advantage of such a process in which the steps for the production and the application of foam take place directly one after the other is that the gas content in the one-component, moisture-curing foam can be varied for a very short time. Thus, one-component, moisture-curing foams can be produced from the same composition Z and have different properties owing to their different gas content. The application of these one-component, moisture-curing foams can be effected by such a process without setting down the application device on one piece.

FIG. 2 schematically shows a bead of a one-component, moisture-curing foam 3 on a substrate S1 4, a section (in the circle) being shown on a larger scale. The gas is present in cells or pores 6 which are distributed uniformly in the composition Z.

FIG. 3 schematically shows a bonnet of an automobile, consisting of an outer metal sheet 5 and a rib-like inner metal sheet 5' underneath for providing rigidity, prior to the adhesive bonding. A one-component, moisture-curing foam is applied as an adhesive from an application device to the steel frame 5' without said application device being set down. Depending on the position of the adhesive bond, a foam having a different gas content is applied. At those positions which require particularly high strength and have to withstand high mechanical loads, a one-component, moisture-curing foam 3a having a low gas content, i.e. having a gas content of 10 to 40% by volume, is preferably applied. At positions where the one-component, moisture-curing foam is to have only limited structural properties, for example in the inner region of the bonnet, where the one-component, moisture-curing foam is applied purely as a lining adhesive, a one-component, moisture-curing foam 3b having a high gas content, i.e. having a gas content of 30 to 60% by volume, is used. By changing the mixing ratio of the composition Z and of the gas during the production and application process, it is possible to apply one-component, moisture-curing foams having a low gas content 3a and those having a high gas content 3b to the piece without discontinuation from the same apparatus.

FIG. 4 schematically shows a side window 7 of an automobile, on the edge of which a one-component, moisture-curing foam has been applied as an adhesive. As described in FIG. 3, the foam is applied from a single application device. A one-component, moisture-curing foam 3a having a low gas content is applied in the corners of the side window. A one-component, moisture-curing foam 3b having a high gas content is applied in the intermediate regions where the one-component, moisture-curing foam must have low strength.

Furthermore, the invention comprises a moisture-cured foam which is obtained by a step comprising the curing of a one-component, moisture-curing foam as described above.

Preferably, the gas in the moisture-cured foam is enclosed in pores which have a diameter of ≤1 mm, in particular ≤0.5 mm, preferably ≤0.1 mm, and are distributed homogeneously in the composition.

Furthermore, the present invention comprises an article resulting from such processes for adhesive bonding, sealing, coating or foam-filling. Such an article is preferably a vehicle or an add-on part of a vehicle, in particular an automobile.

Furthermore, the one-component, moisture-curing foam according to the invention is suitable not only for automotive construction but also for other fields of use. Related applications in the construction of means of transport, such as ships, lorries, buses or railway vehicles, or the construction of consumer goods, such as, for example, washing machines, should be mentioned in particular.

EXAMPLES

Production of a One-Component, Moisture-Curing Foam 300 g of the polyurethane sealant Sikaflex® 252, which is based on polyurethanes having isocyanate groups and is commercially available from Sika Schweiz AG, are weighed into a metal can and stirred in a dissolver at a stirring speed of 2500 revolutions per minute and a disc diameter of 8 cm for 7 minutes with up and down movements of the can. At the same time, dry nitrogen was blown into the adhesive via a pressure line at a pressure of 3 bar. At a constant mass, the density decreased from 1.18 kg/m$^3$ to 1.05 kg/m$^3$, which corresponds to a volume increase of about 11%. Thus, a one-component, moisture-curing foam having a proportion of 11% by volume of gas was produced.

Experiments

The one-component, moisture-curing foam which was produced as described above was applied by hand with a spatula to a steel sheet coated by cathodic electrodeposition (CED) and as usually used in automotive construction. As a reference example, the unexpanded sealant was applied directly along the side in the same manner. The test specimen was then cured at a temperature of 23° C. and a relative humidity of 50% for 7 days.

Results

The foam according to the invention had very good adhesion to the substrate. Furthermore, by cutting open the moisture-cured foam, it was found that the gas-filled pores of the foam are distributed very uniformly, i.e. homogeneously, in the foam.

BRIEF DESCRIPTION OF THE DRAWINGS

Working examples of the invention are explained in more detail below with reference to the drawings. Identical elements or elements having the same effect are provided with the same reference numerals in the various figures. Of course, the invention is not limited to working examples shown and described.

Figure 1:
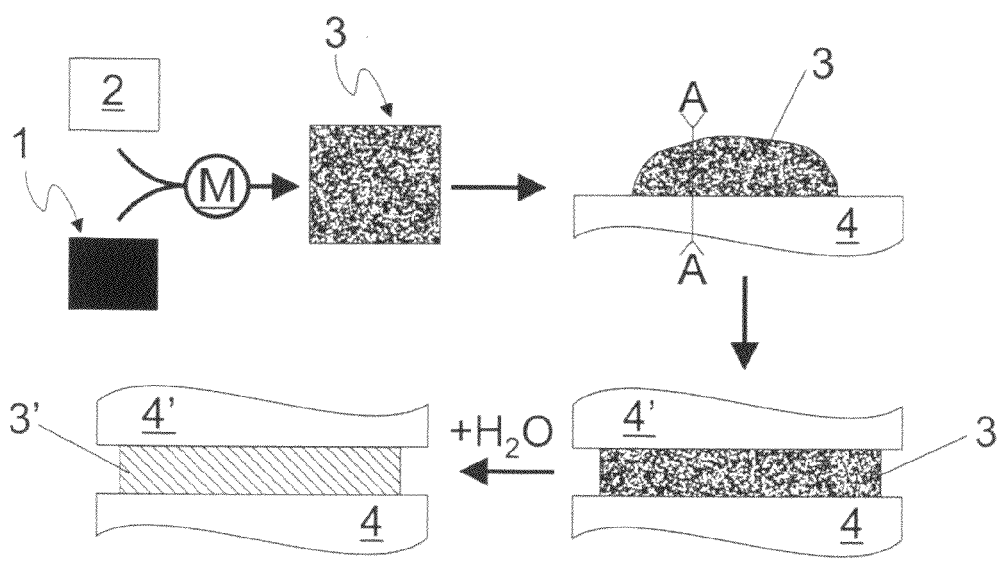
FIG. 1 schematically shows a process for the production, the application and the curing of a one-component, moisture-curing foam.
Figure 2:
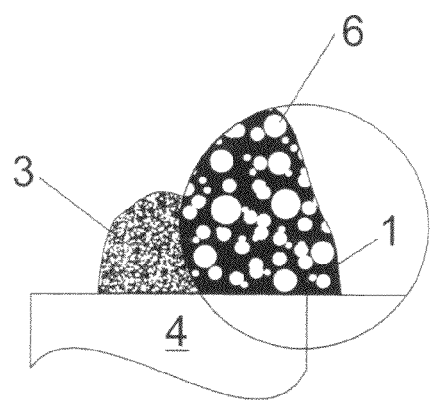
FIG. 2 schematically shows a cross section through a bead of a one-component, moisture-curing foam or along the line A-A in FIG. 1.
Figure 3:
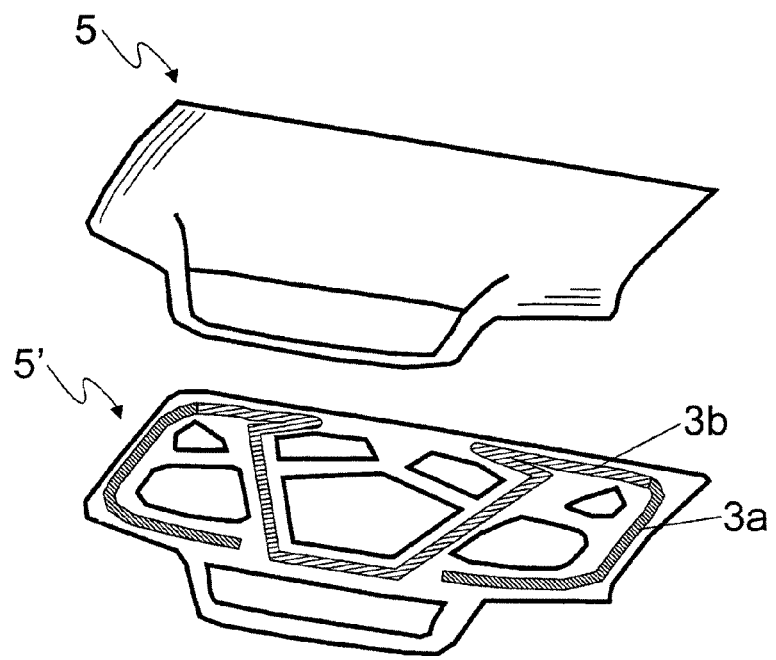
FIG. 3 shows a schematic diagram of a bonnet of an automobile, consisting of a steel sheet and a steel frame underneath, prior to adhesive bonding.
Figure 4:
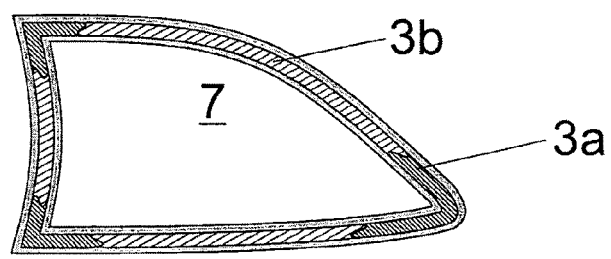
FIG. 4 schematically shows a side window of an automobile with applied adhesive.

Only the elements essential for the direct understanding of the invention are shown in the figures.

LIST OF REFERENCE NUMERALS 1 composition Z
2 gas container
3 one-component, moisture-curing foam
3a one-component, moisture-curing foam having a low gas content
3b one-component, moisture-curing foam having a high gas content
3' moisture-cured foam
4 part to be joined/substrate S1
4' part to be joined/substrate S2
5 bonnet/outer metal sheet
5' bonnet/inner metal sheet
6 cells/pores
7 side window
M mixing device

The invention claimed is:

1. One-component, moisture-curing foam comprising
   a) 30 to 60% by volume of at least one gas, the gas being enclosed in cells that are homogeneously distributed in the foam, and
   b) a one-component, moisture-curing composition Z being a sealant or adhesive that is free of chemical blowing agents, the composition Z comprising
   b1) at least one polymer P having isocyanate groups and/or alkoxysilane groups, the at least one polymer being present in an amount of from 25 to 50% by weight based on the total weight of the one-component, moisture-curing foam,
   b2) carbon black being present in an amount of from 10 to 30% by weight based on the total weight of the one-component, moisture-curing foam, and
   b3) a thixotropic agent C being present in an amount of from 5 to 25% by weight based on the total weight of the one-component, moisture-curing foam, wherein the thixotropic agent is a urea derivative.

2. One-component, moisture-curing foam according to claim 1, wherein the polymer P is a polyurethane polymer having isocyanate groups, wherein the polymer P includes about 1% to about 10% by weight of free isocyanate groups, and wherein the polymer P is a polyurethane polymer formed by polymerizing units having an isocyanate group and units having a hydroxyl group, the isocyanate to hydroxyl ratio ranging from about 1.8 to about 3.

3. One-component, moisture-curing foam according to claim 1, wherein the gas is selected from the group consisting of dried nitrogen ($N_2$), hydrogen ($H_2$), carbon monoxide (CO), nitrous oxide ($N_2O$), noble gas, dried air, and any combination thereof.

4. Process for the production of a one-component, moisture-curing foam according to claim 1, wherein the gas is fed to the one-component, moisture-curing composition Z at temperatures of 10 to 60° C. and is mixed into the composition and distributed with the aid of a mixing apparatus.

5. Process for the adhesive bonding of substrates S1 and S2, comprising the steps
   c1) application of a one-component, moisture-curing foam according to claim 1 to a substrate S1; and
   c2) bringing of the one-component, moisture-curing foam into contact with a second substrate S2;
   or as an alternative to steps c1) and c2)
   d1) application of a one-component, moisture-curing foam according to claim 1 to the substrates S1 and S2; and
   d2) joining of the two substrates S1 and S2 coated with the one-component, moisture-curing foam;
   the substrate S1 consisting of a material which is identical to or different from that of the substrate S2.

6. Process for sealing of a substrate S1 and/or S2, comprising the steps
   e1) application of a one-component, moisture-curing foam according to claim 1 to a substrate S1 and/or S2;
   or
   f1) application of a one-component, moisture-curing foam according to claim 1 between the surfaces of the substrates S1 and S2;
   the substrate S1 consisting of a material which is identical or different from that of the substrate S2.

7. Process for the foam-filling of hollow structures, comprising the step
   h1) injection of a one-component, moisture-curing foam according to claim 1 into an existing hollow structure.

8. Process according to claim 5, wherein the degree of foaming of the composition Z and hence the gas content of the one-component, moisture-curing foam are varied during the application of the foam.

9. Moisture-cured foam, wherein the foam is obtained from a one-component, moisture-curing foam according to claim 1.

10. Moisture-cured foam according to claim 9, wherein the gas is enclosed in pores which have a diameter of ≤0.1 mm and are homogeneously distributed in the composition.

11. Article which was adhesively bonded, sealed, or foam-filled by a process according to claim 5.

12. Article according to claim 11, wherein the article is a vehicle, a means of transport or a consumer article.

13. A process for adhesive bonding of substrates S1 and S2 with a substantially completely foamed one-component, moisture-curing foam, comprising:
   a) providing a one-component, moisture-curing composition Z being an adhesive comprising
      a1) at least one polymer P having isocyanate groups and/or alkoxysilane groups, the at least one polymer being present in an amount of from 25 to 50% by weight based on the total weight of the substantially completely foamed one-component, moisture-curing foam,
      a2) carbon black being present in an amount of from 10 to 30% by weight based on the total weight of the substantially completely foamed one-component, moisture-curing foam,
      a3) a thixotropic agent C being present in an amount of from 5 to 25% by weight based on the total weight of the substantially completely foamed one-component, moisture-curing foam, wherein the thixotropic agent is a urea derivative, and
   b) foaming the one-component, moisture-curing composition Z by mixing the one-component, moisture-curing composition Z with 30 to 60% by volume of at least one gas to form the substantially completely foamed one-component, moisture-curing foam;

c) applying the substantially completely foamed one-component, moisture-curing foam to substrate S1; and
d) bringing substrate S2 into contact with the foam to adhesively bond substrates S2 and S1 or as an alternative to steps c and d e) applying the substantially completely foamed one-component, moisture-curing foam to surfaces of substrates S1 and S2; and
f) subsequently joining the surfaces of the two substrates S1 and S2 to adhesively bond substrates S2 and S1.

14. The process according to claim 13, wherein the substantially completely foamed one-component, moisture-curing foam is applied to substrate S1, substrate S2, or a combination thereof immediately after foaming.

15. One-component, moisture-curing foam according to claim 1, wherein the urea derivative is in a carrier material selected from the group consisting of diisodecyl phthalate and dioctyl adipate, and a ratio of the urea derivative to the carrier material ranges from 0.05:1 to 0.3:1.

16. One-component, moisture-curing foam according to claim 15, wherein the urea derivative comprises a reaction product of an aromatic monomeric diisocyanate with an aliphatic amine compound.

17. One-component, moisture-curing foam according to claim 1, wherein the urea derivative comprises a reaction product of an aromatic monomeric diisocyanate with an aliphatic amine compound.

18. One-component, moisture-curing foam according to claim 1, wherein the at least one polymer P has isocyanate groups and alkoxysilane groups.

19. Process for the production of a one-component, moisture-curing foam according to claim 1, wherein:
the gas, which is present in the liquid or supercritical state, is injected into the one-component, moisture-curing composition Z which is under pressure, mixed into the composition Z and distributed with the aid of a mixing apparatus and expanded during the subsequent pressure relief of the composition so that the foam forms.

* * * * *